United States Patent
Du

(10) Patent No.: US 12,259,632 B2
(45) Date of Patent: Mar. 25, 2025

(54) OPTICAL ASSEMBLY FOR ENLARGING SPECTRAL BANDWIDTHS AND REDUCING ULTRASHORT PULSES

(71) Applicant: Keming Du, Aachen (DE)

(72) Inventor: Keming Du, Aachen (DE)

( * ) Notice: Subject to any disclaimer, the term of this patent is extended or adjusted under 35 U.S.C. 154(b) by 108 days.

(21) Appl. No.: 18/017,675

(22) PCT Filed: Jun. 30, 2021

(86) PCT No.: PCT/EP2021/000074
§ 371 (c)(1),
(2) Date: Jan. 24, 2023

(87) PCT Pub. No.: WO2022/022847
PCT Pub. Date: Feb. 3, 2022

(65) Prior Publication Data
US 2023/0296959 A1 Sep. 21, 2023

(30) Foreign Application Priority Data
Jul. 26, 2020 (DE) .................. 10 2020 004 501.4

(51) Int. Cl.
*G02F 1/35* (2006.01)
(52) U.S. Cl.
CPC .......... *G02F 1/3525* (2013.01); *G02F 1/3503* (2021.01); *G02F 1/3542* (2021.01); *G02F 1/3505* (2021.01); *G02F 2203/50* (2013.01)
(58) Field of Classification Search
CPC .................................................. G02F 1/3525
See application file for complete search history.

(56) References Cited

U.S. PATENT DOCUMENTS

| | | | | |
|---|---|---|---|---|
| 11,846,866 B2 * | 12/2023 | Bauer | .................. | G02F 1/3511 |
| 2011/0170172 A1 | 7/2011 | Mizushima et al. | | |
| 2017/0125964 A1 | 5/2017 | Russbueldt et al. | | |
| 2023/0296959 A1 * | 9/2023 | Du | ........................ | H01S 3/0092 |
| | | | | 359/326 |

FOREIGN PATENT DOCUMENTS

| | | |
|---|---|---|
| DE | 10 2014 007 159 A1 | 11/2015 |
| DE | 10 2015 005 257 A1 | 10/2016 |
| WO | WO-2023079155 A1 * | 5/2023 |

OTHER PUBLICATIONS

J. Schulte et al.: "375 W, 37.5μJ, <170 fs laser system utilizing nonlinear pulse compression in fused silica", Proceedings of SPIE, vol. 10082, pp. 1008217-1-1008217-9 (2017).

(Continued)

*Primary Examiner* — Rhonda S Peace
(74) *Attorney, Agent, or Firm* — Norman B. Thot

(57) ABSTRACT

An optical arrangement for enlarging spectral bandwidths by nonlinear self-phase modulation for shortening ultrashort pulses using a multipass cell and a nonlinear medium. The nonlinear medium is arranged within the multipass cell, and a laser beam having ultrashort pulses passes through the nonlinear medium multiple times. The laser beam is coupled into the multipass cell by way of a shaping optical unit. The laser beam is shaped into an astigmatic beam and coupled into the multipass cell by way of the shaping optical unit.

12 Claims, 10 Drawing Sheets

(56) References Cited

OTHER PUBLICATIONS

H. Cao et al.: "Multipass-cell-based post-compression of radially and azimuthally polarized pulses to the sub-two-cycle regime", Journal of the Optical Society of America, vol. 36, No. 9, pp. 2517-2525 (2019).
A. Gupta et al.: "Astigmatic multipass cell with cylindrical lens", Journal of Optics, Springer India, vol. 46, No. 3, pp. 324-330 (2016).
J. Brons et al.: "Efficient, high-power, all-bulk spectral broadening in a quasi-waveguide", Conference on Lasers and Electro-Optics Europe & European Quantum Electronics Conference, p. 1 (2017).

* cited by examiner

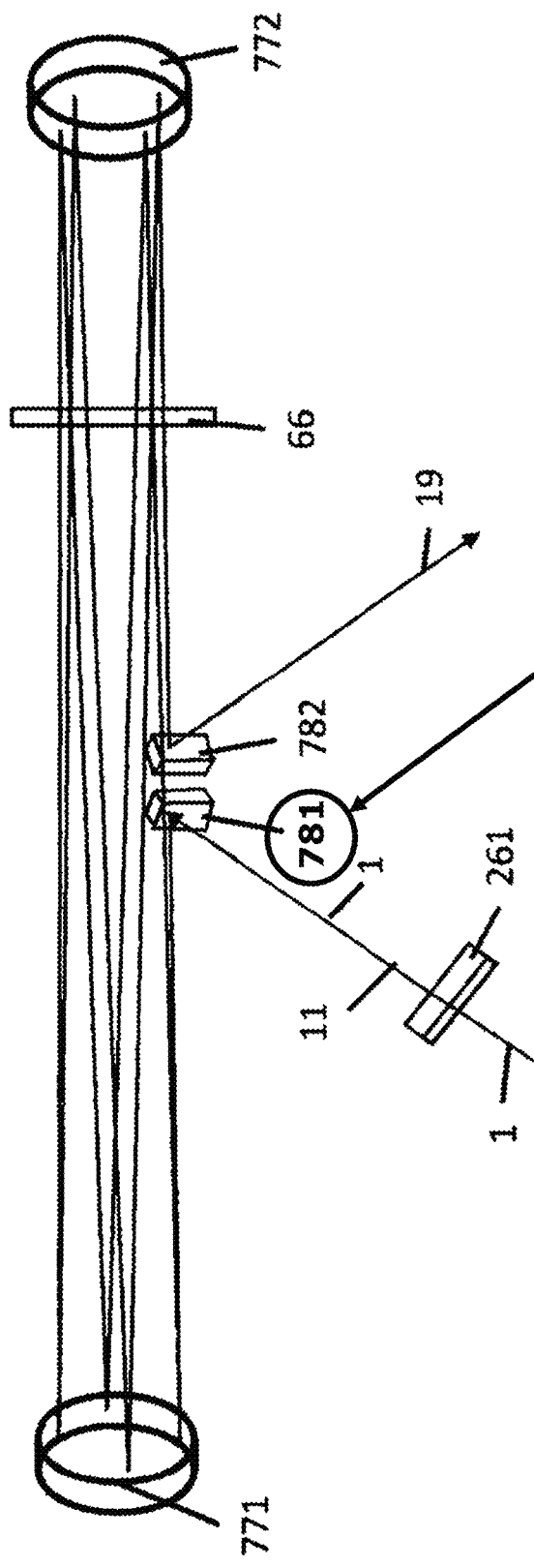
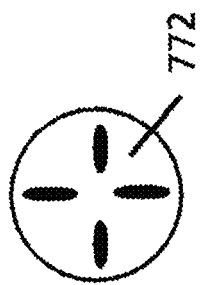
Fig. 4
Fig. 3
Fig. 2

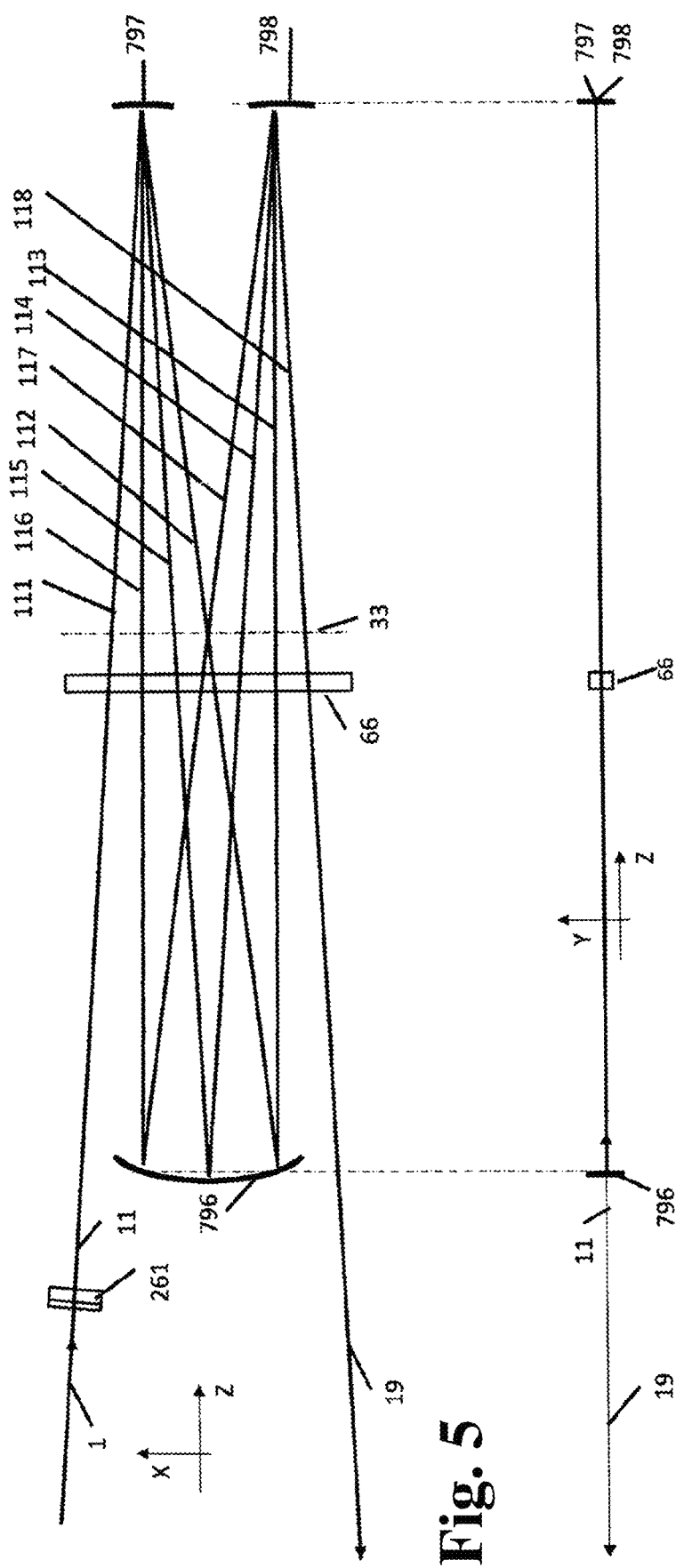

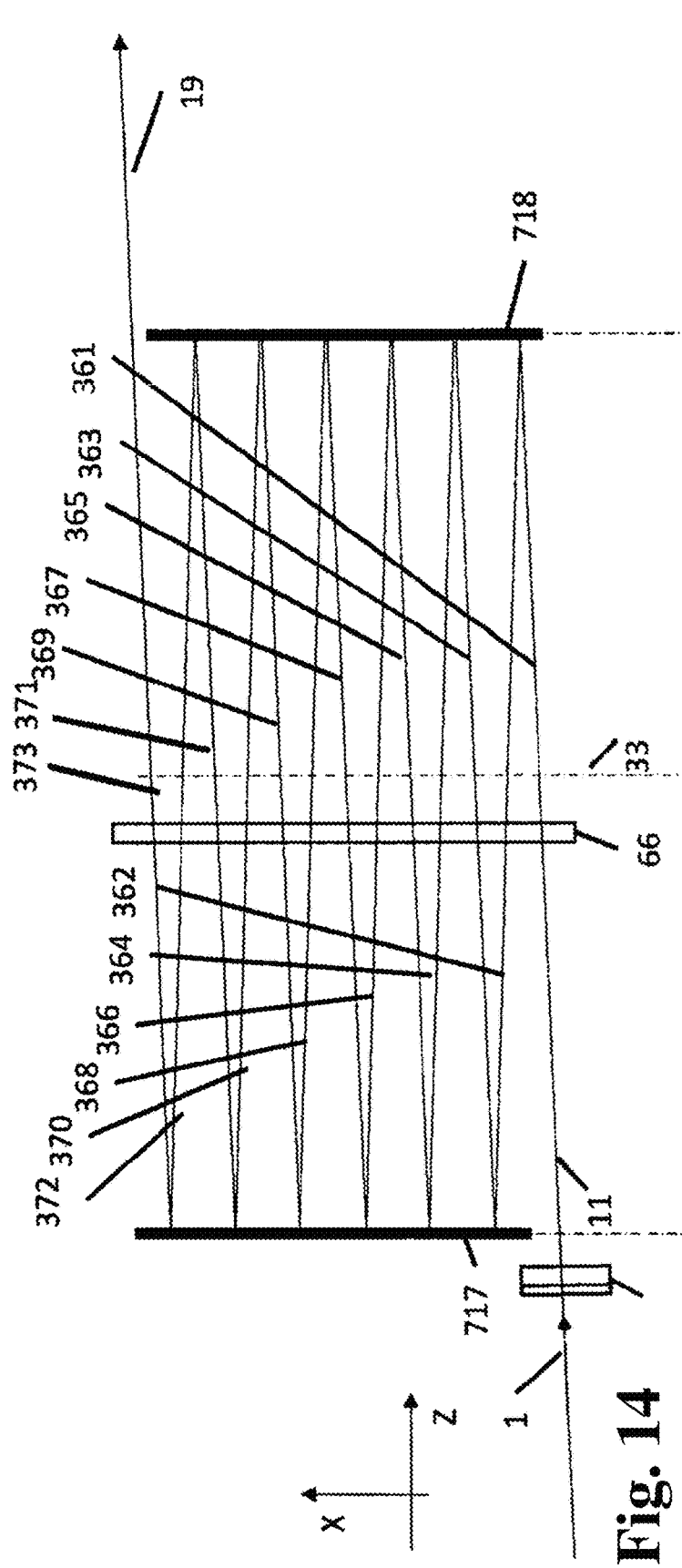
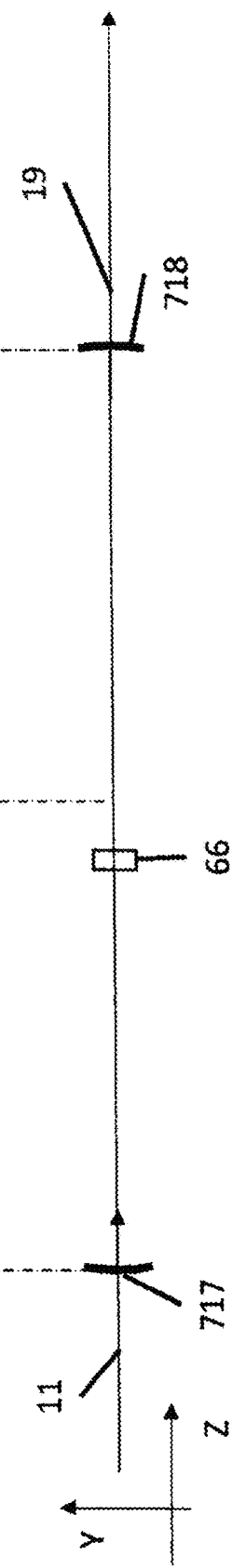
Fig. 14
Fig. 15

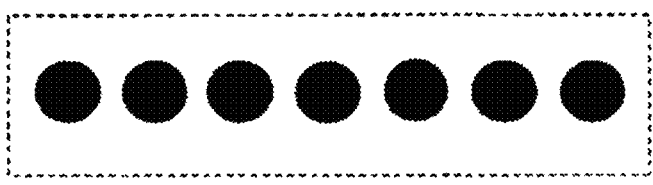
Fig. 23
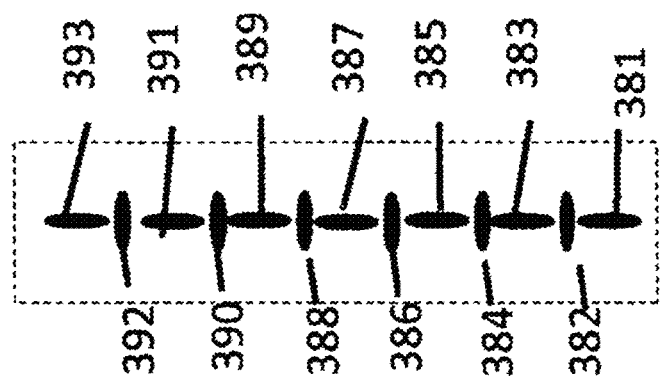
Fig. 22
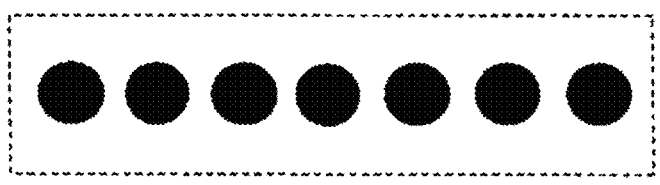
Fig. 21
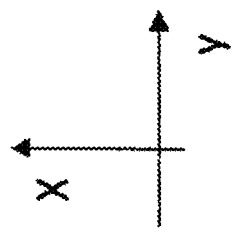

OPTICAL ASSEMBLY FOR ENLARGING SPECTRAL BANDWIDTHS AND REDUCING ULTRASHORT PULSES

CROSS REFERENCE TO PRIOR APPLICATIONS

This application is a U.S. National Phase application under 35 U.S.C. § 371 of International Application No. PCT/EP2021/000074, filed on Jun. 30, 2021 and which claims benefit to German Patent Application No. 10 2020 004 501.4, filed on Jul. 26, 2020. The International Application was published in German on Feb. 3, 2022 as WO 2022/022847 A1 under PCT Article 21(2).

FIELD

The present invention relates to an optical assembly with which it is possible to carry out the necessary enlargement of a bandwidth using a self-phase modulation (SPM) in a compact design without a self-focusing, caused by the Kerr effect, which leads to a reduction of the beam quality and without damaging the shaping optical unit due to a high power density.

BACKGROUND

Material processing using ultrashort pulse lasers is becoming increasingly important for precise and flexible production methods. The high precision is based principally on the fact that the laser pulses are shorter than the characteristic time constants for the thermal interactions between the laser pulses and the materials to be processed. It generally holds true that the shorter the pulses, the more precise the processing.

Ultrashort pulse lasers for industrial material processing consist of an oscillator-amplifier arrangement. The pulse length of the oscillator is determined by the bandwidth of the laser medium used. In this regard, the typical pulse duration of a mode-locked Yb:YAG oscillator is 700 fs. Oscillator-amplifier arrangements are used in order to generate a pulse energy relevant to material processing. Owing to the bandwidth of the gain medium, the bandwidth of the amplified pulses is reduced on account of gain narrowing, as a result of which the amplified pulses are lengthened.

The nonlinear process of self-phase modulation can be used for enlarging the bandwidth. However, self-phase modulation is associated with spatial phase modulations, such as the Kerr lens effect. The Kerr lens effect can lead to catastrophic self-focusing and to an unacceptable reduction of the beam quality.

Stigmatic beams are predominantly used for material processing. A stigmatic beam has circular power density distributions in each plane which is perpendicular to the propagation direction, with free propagation. The beam waists of a stigmatic beam have the same size in two mutually perpendicular planes and lie jointly at the same position. In this case, the power density is inversely proportional to the square of the beam diameter. In the case of stable and compact optical set-ups, this leads to a very high power density at focuses, in mirrors or in lenses. An excessively high power density can lead to the destruction of optical units, such as lenses and mirrors.

DE 10 2014 007 159 A1 describes a method and an arrangement for spectrally broadening laser pulses for nonlinear pulse compression.

The laser pulses are coupled into an optical arrangement in which they propagate alternatively through at least one section which contains at least one medium having nonlinear optical properties and in which the laser pulses acquire a nonlinear phase as a result of self-phase modulation, and a section in which substantially no nonlinear phase is generated by self-phase modulation.

DE 10 2015 005 257 A1 describes an optical arrangement for increasing the beam quality and for improving the intensity distribution of a laser beam. Use is made of one or more spherical and/or cylindrical components, such as lenses and/or mirrors, by which the beam is focused. At least two stops are used in the focus region of the components in series along the beam propagation, the aperture shapes and sizes of the stops being determined by the beam cross-section at the respective axial position of the stops.

The publication Brons, Jonathan, et al. Efficient, high-power, all-bulk spectral broadening in a quasi-waveguide, 2017 Conference on Lasers and Electro-Optics Europe & European Quantum Electronics Conference (CLEO/Europe-EQEC), IEEE, 2017, page 1-1, relates to efficient, high-power spectral broadening of ultrashort pules in a quasi-waveguide.

SUMMARY

An aspect of the present invention is to specify optical arrangements which make it possible to generate a defined enlargement of the bandwidth by self-phase modulation (SPM) with a compact design.

In an embodiment, the present invention provides an optical arrangement for enlarging spectral bandwidths by nonlinear self-phase modulation for shortening ultrashort pulses, wherein a multipass cell and a nonlinear medium are used, wherein the nonlinear medium is arranged within the multipass cell, and a laser beam having ultrashort pulses passes through the nonlinear medium multiple times, wherein the laser beam is coupled into the multipass cell by way of a shaping optical unit, and wherein the laser beam is shaped into an astigmatic beam and coupled into the multipass cell by way of the shaping optical unit.

BRIEF DESCRIPTION OF THE DRAWINGS

The present invention is described in greater detail below on the basis of embodiments and of the drawings in which:

FIG. 2 shows a Herriot multipass cell;
FIG. 3 shows the mirror 771 from FIG. 2 with the beam cross-sections of the laser beams impinging on the mirror;
FIG. 4 shows the mirror 772 from FIG. 2 with the beam cross-sections of the laser beams impinging on the mirror;
FIG. 5 shows a further embodiment of a multipass cell in a plan view;
FIG. 6 shows the further embodiment of the multipass cell of FIG. 5 in a side view.

FIG. 14 shows a further embodiment of the arrangement according to the present invention having two cylindrical, concave mirrors in a plan view;

FIG. 15 shows the further embodiment of FIG. 14 in a corresponding side view;

FIG. 21 shows the beam cross-sections of the laser beams on the mirror 727;

FIG. 22 the beam cross-sections of the laser beams in the central plane 66;

FIG. 23 shows the beam cross-sections of the laser beams on the mirror 728;

DETAILED DESCRIPTION

Figure 1:
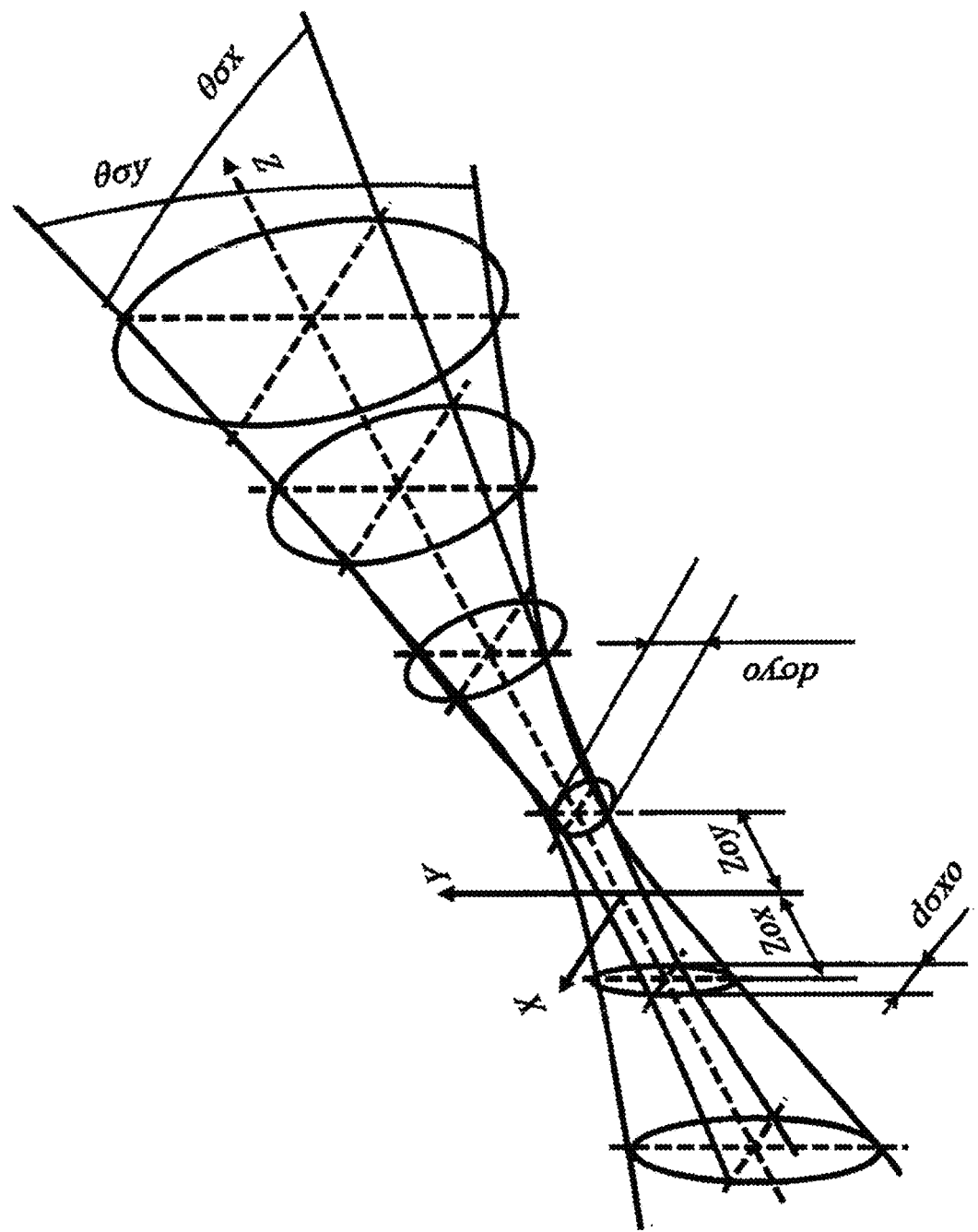
FIG. 1 shows a schematic example of an astigmatic beam.

According to the invention, the optical arrangement for enlarging spectral bandwidths by nonlinear self-phase modulation for shortening ultrashort pulses uses a multipass cell and a nonlinear medium. The nonlinear medium is arranged within the multipass cell, and a laser beam having ultrashort pulses passes through the nonlinear medium multiple times. The laser beam is coupled into the multipass cell by way of a shaping optical unit, wherein the laser beam is shaped into an astigmatic beam and coupled into the multipass cell by way of the shaping optical unit.

Such an arrangement makes it possible to generate a defined enlargement of the bandwidth by self-phase modulation (SPM) with a compact design, without the self-focusing caused by the Kerr lens effect leading to a reduction of the beam quality and without shaping optical units being damaged by high power densities.

The multipass cell is preferably a Herriot multipass cell.

In one advantageous embodiment, the multipass cell consists of three cylindrical mirrors. The three cylindrical mirrors are designed and arranged such that their curvatures lie in a common xz-plane and their focal planes are situated in a common focal plane. By means of the shaping optical unit, the beam is designed and arranged such that the beam is transformed into a beam which is collimated in the yz-plane and has a focus in the xz-plane, and that the nonlinear medium is positioned in the focal plane or in the vicinity of the focal plane.

The x-, y- and z-coordinates are a rectangular coordinate system, wherein the z-coordinate is parallel to the propagation direction, and the x-coordinate and the y-coordinate are perpendicular to one another and to the propagation direction.

In a further advantageous embodiment, the multipass cell consists of three spherical mirrors. The three spherical mirrors are designed and arranged such that they form a White multipass cell and have a common focal plane, wherein the shaping optical unit is designed and arranged such that the beam is transformed into an astigmatic beam which is collimated in the yz-plane and has a focus in the xz-plane, or is collimated in the xz-plane and has a focus in the yz-plane, wherein the nonlinear medium is positioned in the focal plane or in the vicinity of the focal plane. The x-, y-, z-coordinates form a rectangular xyz-coordinate system with the z-coordinate parallel to the propagation direction of the beam.

Moreover, an optical arrangement is provided whose multipass cell consists of two cylindrical mirrors. The two cylindrical mirrors are designed and arranged such that their focus lines lie in the xz-folding plane and in a common focal plane, and the shaping optical unit is designed and arranged such that the beam is transformed into an astigmatic beam which is collimated in the xz-plane and has a focus in the yz-plane, wherein the nonlinear medium is positioned in the focal plane or in the vicinity of the focal plane. The x-, y-, z-coordinates mentioned form a rectangular xyz-coordinate system.

In a further optical arrangement of the arrangement, the multipass cell consists of two mirror arrays, wherein each mirror array consists of at least two spherical and concave mirror elements. The spherical mirror elements are identically and concavely curved and their focuses lie in a common plane, wherein the shaping optical unit is designed and arranged such that the beam is transformed into an astigmatic beam which is collimated in the yz-plane and has a focus in the xz-plane, or is collimated in the xz-plane and has a focus in the yz-plane, wherein the nonlinear medium is positioned in the focal plane or in the vicinity of the focal plane, with the z-coordinate parallel to the propagation direction of the beam.

It is also advantageous that at least one of the mirrors or at least one of the mirror elements is provided with a coating for dispersion compensation, such that they act like a GDD (group delay dispersion) or GTI (Gires-Tournois interferometer) mirror for compressing the pulses.

It is also provided that in order to increase the beam quality, use is made of at least one stop array in the multipass cell. The apertures of the stop array are adapted in terms of their geometry to the beam cross-sections of the respective beam passage locations. The stop array is arranged at one or more folding mirror/s and/or in the focal plane and/or in the vicinity of the focal plane.

The apertures of the at least one stop array should amount to from 1.3 to 2 times the beam cross-section of the corresponding Gaussian beam.

In order to achieve the effect that the pulse length is minimized or is adapted to the requirements, for pulse compression or pulse shortening of the pulses, gratings, prisms, GDD mirrors and/or GTI mirrors are arranged downstream of the multipass cell on the output side, as viewed in the beam propagation direction, i.e. in the z-direction.

The use of, inter alia, cylindrical shaping optical units, such as cylindrical lenses, cylindrical mirrors or prisms, makes it possible to convert a stigmatic beam into a simple astigmatic beam.

Exemplary embodiments of the invention are evident from the drawing. In the drawing:

In the figures, the x-, y- and z-coordinates specify a rectangular xyz-coordinate system.

FIG. 1 shows one example of a simple astigmatic beam. The simple astigmatic beam propagates in the z-direction. In the xz-plane, the beam has a waist d$\sigma$x0 having a Rayleigh length Z0x. In the yz-plane, the beam has a beam waist d$\sigma$y0 having a Rayleigh length Z0y. $\theta\sigma$x stands for the divergence angle in the xz-plane and $\theta\sigma$y stands for the divergence angle in the yz-plane. In the case of a simple astigmatic beam, the shaping optical unit can be positioned such that the cross-section of the beam becomes approximately round, and so the power density on the shaping optical unit can be considerably reduced without an excessively high intensity being present in the focal plane in this case.

The central concept of the present invention consists in using a multipass cell which consists of a mirror arrangement having mirrors 771, 772, 796, 797, 798, 776, 777, 778, 717, 718 or 727, 728, which are shown in the figures. A nonlinear medium 66 having negligible absorption for generating the self-phase modulation is arranged in the multipass cell, wherein a laser beam 1 is transformed into a defined simple astigmatic beam 11 and coupled into the multipass cell by means of a shaping optical unit 261. The laser beam 11 is reflected back and forth between the mirror arrangement in such a way that it passes through the nonlinear medium 66 multiple times, wherein the curvatures of the mirrors are designed and the mirrors are arranged such that the beam has a plurality of waists within the multipass cell. The waists lie at different z-positions in the xz-planes and in the yz-planes.

In the drawing. FIG. 2 shows a Herriot multipass cell consisting of two spherical mirrors 771 and 772. A beam 1 or laser beam 1 is shaped into a simple astigmatic beam 11 by the use of a shaping optical unit 261. The simple astigmatic beam 11 is coupled into the Herriot multipass cell by means of an edge mirror 781, i.e. a mirror having a sharp edge. The mirrors 771 and 772 are designed and arranged with respect to one another such that in interaction with a shaping optical unit 261, the beam has a varying elliptical cross-section along the propagation direction within the multipass cell. By way of example, FIG. 3 shows the beam cross-sections of the beam at the mirror 771 and FIG. 4 shows the beam cross-sections of the beam at the mirror 772. A medium 66 is arranged within the multipass cell. The medium 66 has a negligible absorption for the beam 11 and acts as a nonlinear medium which leads to the self-phase modulation at a high pulse power density. One exemplary medium is a quartz glass plate coated antireflectively for the beam 11 on both surfaces. Use of a further edge mirror 782 allows the beam to be coupled out of the multipass cell as an output beam 19. The accumulated self-phase modulation on account of the multiple passage through the nonlinear medium leads to broadening of the beam spectrum.

One extremely simple embodiment of the shaping optical unit 261 consists of a cylindrical lens having a defined focal length. The focal length should be chosen and set such that the focus of the beam lies in the focused plane, in the focal plane or in the vicinity of the focal plane 33.

The dispersion of the medium and of air leads to varying propagation velocities for different wavelengths. This leads to lengthening of the pulse duration of the beam. The pulses of the beam can be compressed or shortened by a downstream arrangement composed of dispersive shaping optical units. By way of example, gratings, mirrors, such as GDD mirrors, GTI mirrors, prisms, etc., can be used for pulse compression.

It is advantageous that at least one of the mirrors 771 and 772 is a GDD (group delay dispersion) or GTI (Gires-Tournois interferometer) mirror. The dispersion of the mirror is chosen such that the dispersion caused by the medium and air is compensated for and the pulse length is shortened on account of incremental broadening of the beam spectrum after each pulse.

FIGS. 5 and 6 illustrate a further embodiment. In this case, FIG. 5 shows the plan view and FIG. 6 side view of a multipass cell. The multipass cell consists of three cylindrical mirrors 796, 797 and 798. The curvatures of the mirrors lie in the xz-plane. In the case shown, these three mirrors have the same radius of curvature. The mirrors 797 and 798 are advantageously arranged one above the other in the x-direction with the same z-position. The mirror 796 is positioned with respect to the mirrors 797 and 798 such that the distance is equal to the radius of curvature of the mirrors 797 and 798. In this regard, the mirrors form a confocal arrangement. The interrupted line symbolizes the central plane 33 of the multipass cell. In this specific case, the central plane 33 is simultaneously the focal plane of the mirrors 796, 797 and 798. A nonlinear medium 66 is arranged in the vicinity of the central plane 33. The astigmatic beam 11 shaped by a shaping optical unit 261 is coupled into a multipass cell. In the case of this embodiment shown, eight beam paths 111, 112, 113, 114, 115, 116, 117 and 118 arise within the multipass cell. In principle, the beam 1 can have an arbitrary cross-section. For a simplified illustration it is assumed that the beam 1 has a circular cross-section. The shaping optical unit 261 is designed and arranged such that the beam 11 is approximately collimated in the yz-focal plane and, in the xz-focal plane, the beam waist of the input beam lies on the central plane 33. After reflection by the mirror 797, the beam is collimated in the xz-focal plane, and so the reflective beam 112 becomes a collimated beam having an approximately circular cross-section.

By way of suitable incidence of the beam 11 and orientation of the mirrors, 4*N passes (beam paths) can be generated within the cell. In this case, N is an integer.

The beam 112 is reflected by the mirror 796 to a beam 113 in focusing fashion in the xz-focal plane. The beam 113 has its focus in the central or focal plane 113. In this regard, it has an elliptical beam cross-section in the central plane 33. The beam 113 is reflected and collimated by the mirror 798 to form a beam 114. The beam 114 has an approximately circular cross-section.

Figure 9:
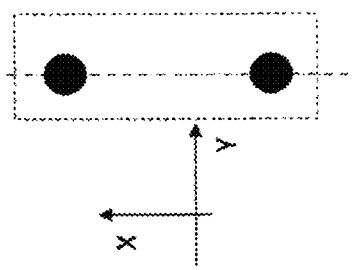
FIG. 9 shows the beam cross-sections of the laser beams at mirrors 797 and 798.
Figure 8:
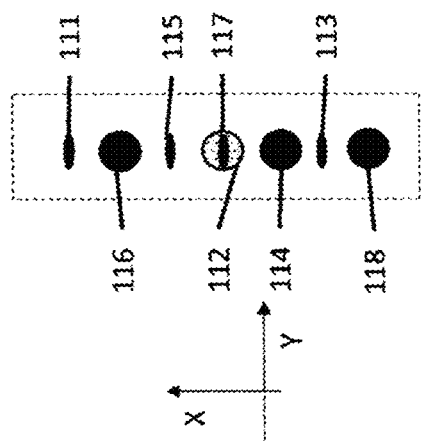
FIG. 8 shows show the beam cross-sections of the laser beams in the central plane 66.
Figure 7:
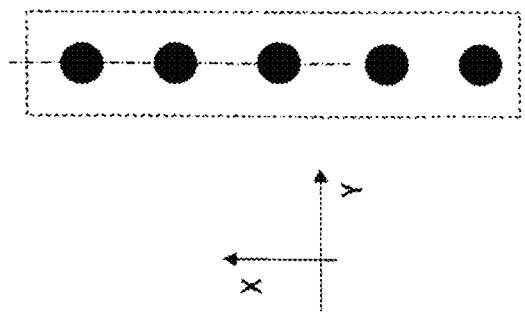
FIG. 7 shows show the beam cross-sections of the laser beams at mirror 796.

In this way, the beam is reflected back and forth and passes through the medium multiple times. In this case, the beam cross-section changes from elliptical to circular and from circular to elliptical again. FIG. 7 shows the cross-sections of the beams at the mirror 796. FIG. 8 illustrates the beam cross-sections in the central plane 33. FIG. 9 shows the beam cross-sections at the mirrors 797 and 798. It is evident that the beam at the mirrors has large and approximately circular cross-sections. This is advantageous in order to avoid damage to the mirrors on account of high peak pulse power.

It is advantageous that at least one of the mirrors 796, 797 and 798 is a GDD or GTI mirror. The dispersion of the mirrors is chosen such that the dispersion caused by the medium and air is compensated for and the pulse length is shortened on account of incremental broadening of the beam spectrum after each pass.

Figures 10, 11, 12, 13:
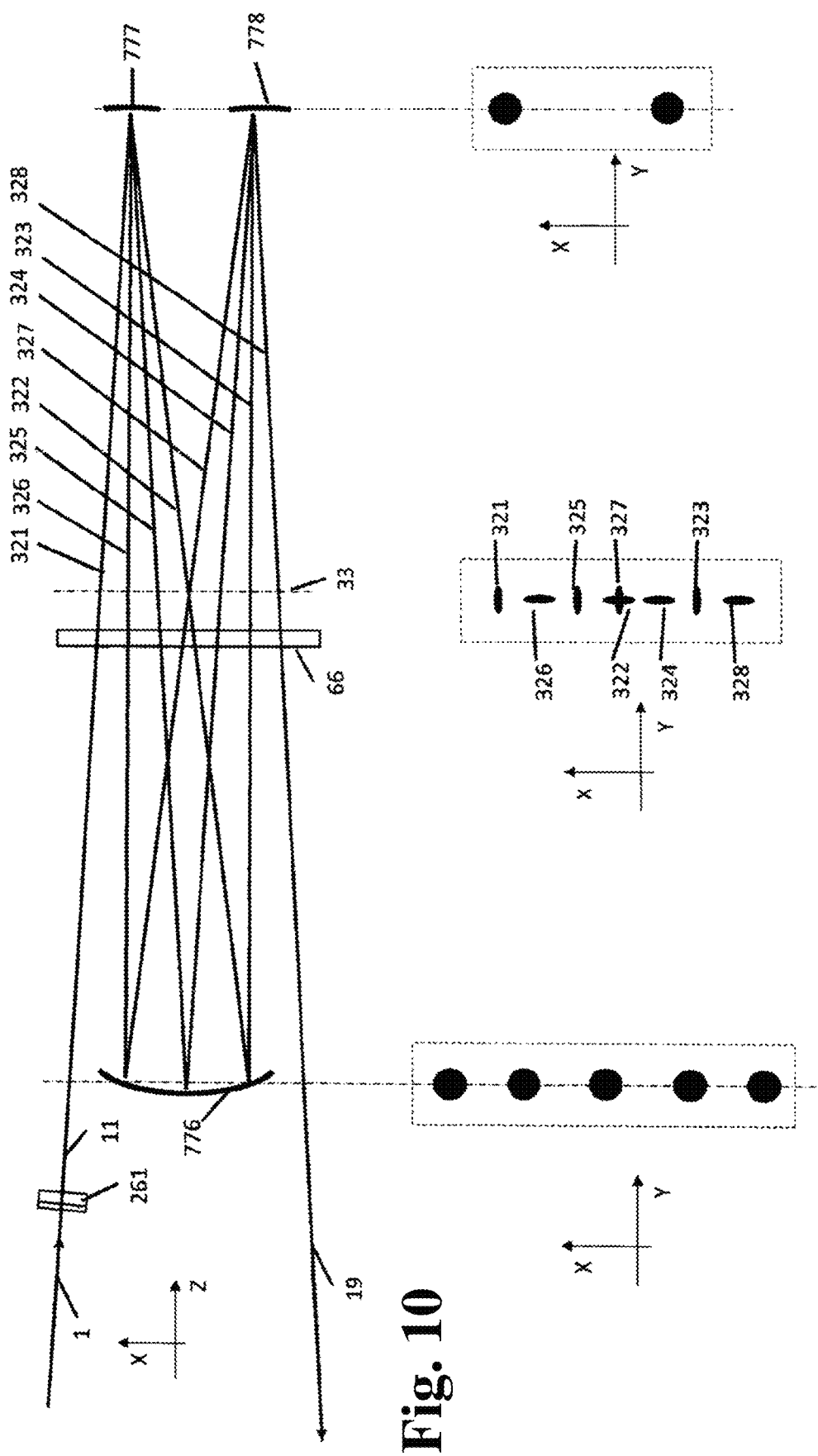
FIG. 10 shows a further embodiment of the arrangement according to the present invention having a multipass cell comprising three spherical, concavely curved mirrors.
FIG. 11 shows the beam cross-sections of the laser beams at the mirror surface 776.
FIG. 12 shows the beam cross-sections of the laser beams in the central plane 66.
FIG. 13 shows the beam cross-sections of the laser beams at the mirror surface 777 and 778.

FIG. 10 shows a further exemplary embodiment according to the invention. The multipass cell consists of three spherical and concave mirrors 776, 777 and 778. In the example shown, the three mirrors have the same radius of curvature. The mirrors 777 and 778 are preferably arranged one above the other with the same z-position. The mirror 776 is arranged with respect to the mirrors 777 and 778 such that the distance is equal to the radius of curvature of the mirrors. In this regard, the mirrors form a confocal arrangement. The interrupted line symbolizes the central plane 33 of the multipass cell. In this specific case, the central plane is simultaneously the focal plane of the mirrors. A nonlinear medium 66 is arranged in the vicinity of the central plane 33 or in the central plane 33. The astigmatic beam 11 shaped by a shaping optical unit 261 is coupled into a multipass cell. In this example shown, eight beam paths 321, 322, 323, 324, 325, 326, 327 and 328 arise within the multipass cell. In principle, the beam 1 can have an arbitrary cross-section. For a simplified illustration it is assumed that the beam 1 has a circular cross-section. The shaping optical unit 261 is designed and arranged such that the beam 11 is approximately collimated in the yz-plane and, in the xz-plane, the beam waist of the input beam lies on the central plane 33. After reflection by the mirror 777, the beam is collimated in the xz-plane, while the beam is focused in the yz-plane, and so the reflected beam 322 is an astigmatic beam which is approximately parallel in the xz-plane and, in the yz-plane, has a beam waist in the central plane and the cross-section of which changes from circular to elliptical and to circular again during propagation.

The beam 322 is reflected as beam 323 by the mirror 776. In this case, the beam is focused in the xz-plane and collimated in the yz-plane. In the xz-plane, the beam 323 has a focus in the central plane 33. In this regard, it has an elliptical beam cross-section in the central plane 33. The elliptical cross-section of the beam 323 is at right angles with respect to the cross-section of the beam 322. The beam 323 is reflected by the mirror 778 to form a beam 324. In this regard, the beam is collimated in the xz-plane and focused in the yz-plane. In this way, the beam is reflected back and forth and passes through the medium multiple times. In this case, the beam cross-section changes from elliptical to circular and from circular to elliptical again. FIG. 11 shows the cross-sections of the beams at the mirror 776. FIG. 12 illustrates the beam cross-sections in the central plane 33. FIG. 13 shows the beam cross-sections at the mirror 777 and 778. It is evident that the beam at the mirrors has large and approximately circular cross-sections in comparison with the focal plane.

In this case, too, it is advantageous that at least one of the mirrors 776, 777 and 778 is a GDD or GTI mirror. The dispersion of the mirror is chosen such that the dispersion caused by the medium and air is compensated for and the pulse length is shortened on account of incremental broadening of the beam spectrum after each pass.

FIGS. 14 and 15 illustrate a further embodiment. In this case, FIG. 14 shows the plan view and FIG. 15 the side view of a multipass cell. The multipass cell consists of two cylindrical, concave mirrors 717 and 718. The cylinder axes of the two mirrors are parallel to one another and lie in the xz-plane. In the case shown, the two mirrors have the same radius of curvature. The mirrors 717 and 798 are advantageously arranged confocally. The interrupted line symbolizes the central plane 33 of the multipass cell. For the confocal case, the central plane is simultaneously the focal plane of the mirrors. A nonlinear medium 66 is arranged in the vicinity of the central plane 33. The astigmatic beam 11 shaped by a shaping optical unit 261 is coupled into a multipass cell at an angle. In this regard, multipasses of zigzag shape arise between the two cylindrical mirrors. In principle, the beam 1 can have an arbitrary cross-section. For a simplified illustration it is assumed that the beam 1 has a circular cross-section. The shaping optical unit 261 is designed and arranged such that the beam 11 is approximately collimated in the xz-plane and, in the yz-plane, the beam waist of the input beam lies on the central plane 33. After reflection by the mirror 718, the beam is collimated in the yz-plane, and so the reflected beam 362 becomes a beam collimated in both planes and having an approximately circular cross-section.

The beam 362 is reflected by the mirror 717 to form a beam 363 in focusing fashion in the yz-plane. In the yz-plane, the beam 363 has a focus in the central plane 33. In this regard, it has an elliptical beam cross-section in the central plane 33. The beam 363 is reflected by the mirror 718 to form a beam 364. In this case, the beam is collimated in the yz-plane. The beam 364 has an approximately circular cross-section.

Figure 18:
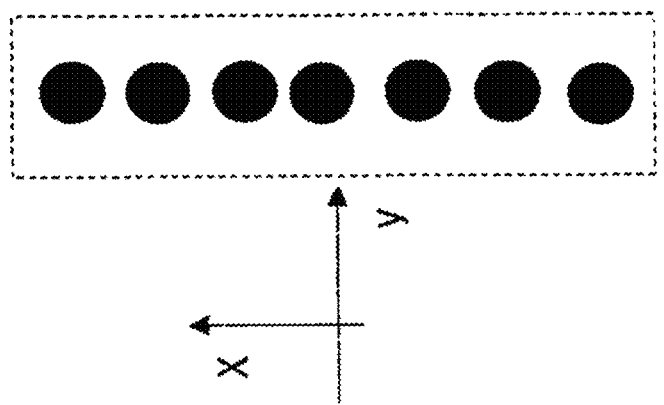
FIG. 18 shows the cross-sections of the laser beams at mirror 718.
Figure 17:
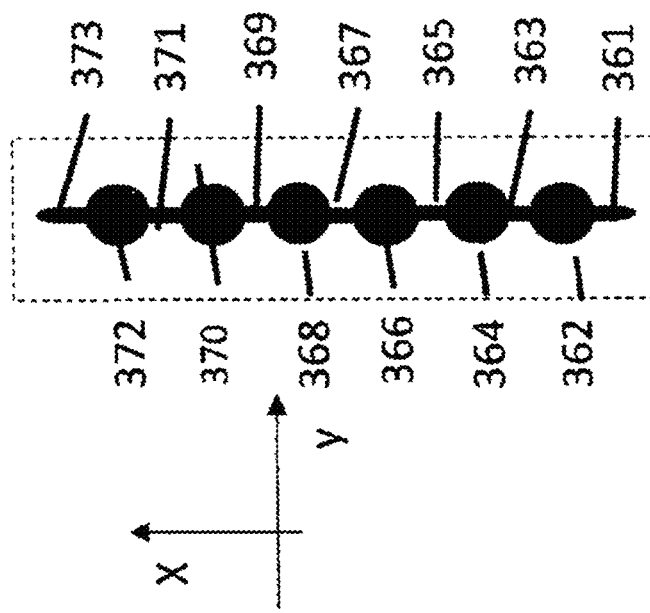
FIG. 17 shows the cross-sections of the laser beams in the central plane 66.
Figure 16:
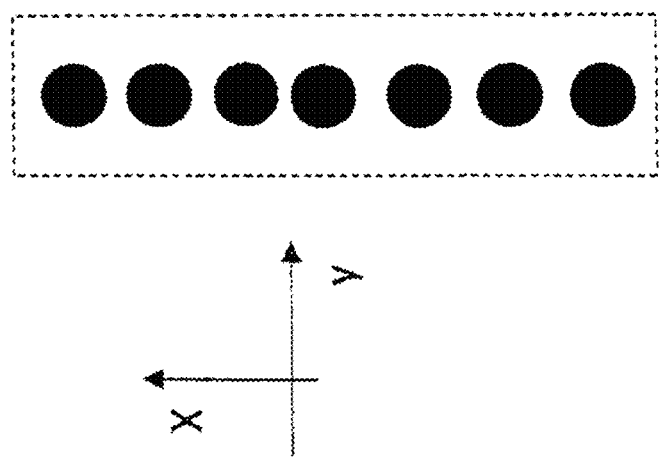
FIG. 16 shows the cross-sections of the laser beams at mirror 717.

In this way, the beam is reflected back and forth by the two mirrors and passes through the medium multiple times. In this case, the beam cross-section changes from elliptical to circular and from circular to elliptical again. FIG. 16 shows the cross-sections of the beams at the mirror 717. FIG. 17 illustrates the beam cross-sections in the central plane 33. FIG. 18 shows the beam cross-sections at the mirror 718. It is evident that the beam at the mirrors has large and approximately circular cross-sections. This is advantageous in order to avoid damage to the mirrors on account of a high peak pulse power.

By means of a suitable angle of incidence of the beam 11, a defined number of passes can be generated within the multipass cell.

It is advantageous that at least one of the mirrors 796, 797 and 798 is a GDD or GTI mirror. The dispersion of the mirror is chosen such that a dispersion caused by the medium and air is compensated for and the pulse length is shortened on account of incremental broadening of the beam spectrum after each pass.

Figures 19, 20:
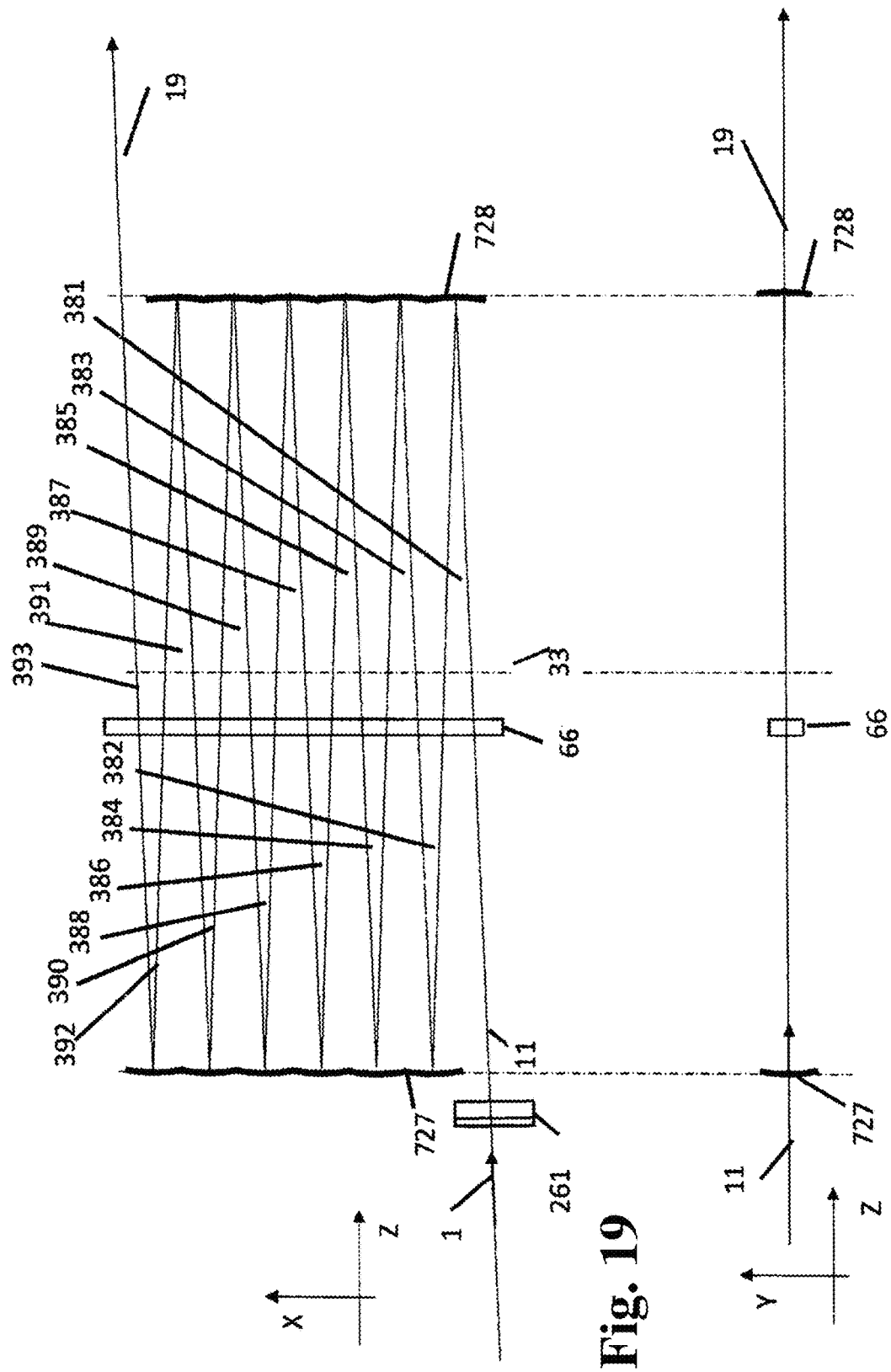
FIG. 19 shows a further embodiment of the arrangement according to present invention having a multipass cell consisting of two mirror arrays constituted by spherical mirror elements having identical, concave curvature in a plan view.
FIG. 20 shows the further embodiment of FIG. 19 in a corresponding side view.

FIGS. 19 and 20 show a further exemplary embodiment according to the invention. FIG. 19 shows a plan view and FIG. 20 the side view of a multipass cell. The multipass cell consists of two mirror arrays 727 and 728. The mirror arrays are formed by spherical mirror elements which are identically and concavely curved. The spherical mirror elements have the same radius of curvature. The two mirror arrays are arranged at a distance from one another which is equal to the radius of curvature. In this regard, the mirror arrays form a confocal arrangement. The interrupted line symbolizes the central plane 33 of the multipass cell. In this confocal case, the central plane is simultaneously the focal plane of the mirrors. A nonlinear medium 66 is arranged in the vicinity of the central plane 33. The astigmatic beam 11 shaped by a shaping optical unit 261 is coupled into the multipass cell. In this example shown, beam paths 381, 382, 383, 384, 385, 386, 387, 388, 389, 390, 391, 392 and 393 arise within the multipass cell. For a simplified illustration it is assumed that the beam 1 has a circular cross-section. The shaping optical unit 261 is designed and arranged such that the beam 11 is approximately collimated in the xz-plane and, in the xz-plane, the beam waist of the input beam lies on the central plane 33. After reflection by a first mirror element of the mirror array 728, the beam is collimated in the xz-plane, while the beam is focused in the yz-plane, and so the reflected beam 382 is an astigmatic beam which is approximately parallel in the yz-plane and, in the xz-plane, has a beam waist in the central plane and the cross-section of which changes from circular to elliptical and to circular again during propagation.

The beam 382 is reflected by a first mirror element of the mirror array 727 to form a beam 383. In this case, the beam is focused in the yz-plane and collimated in the xz-plane. In the yz-plane, the beam 383 has a focus in the central plane 33. In this regard, it has an elliptical beam cross-section in the central plane 33. The elliptical cross-section of the beam 383 is at right angles with respect to the cross-section of the beam 382. The 383 is reflected by a second mirror element of the mirror array 728 to form a beam 384. In this case, the beam is collimated in the yz-plane and focused in the xz-plane. In this way, the beam is reflected back and forth and passes through the medium multiple times. In this case, the beam cross-section changes from elliptical to circular and from circular to elliptical again. FIG. 21 shows the cross-sections of the beams at the mirror array 717. FIG. 22 illustrates the beam cross-sections in the central plane 33. FIG. 23 shows the beam cross-sections at the mirror array 718. It is evident that at the mirror elements the beam has large and approximately circular cross-sections.

In this case, too, it is advantageous that at least one mirror array 717 and 718 is a GDD or GTI mirror. The dispersion of the mirror is chosen such that dispersion caused by the medium and air is compensated for and the pulse length is shortened on account of incremental broadening of the beam spectrum after each pass.

For a stigmatic beam 1 it is advantageous that a cylindrical lens is used for the shaping optical unit 261, the focal length of said cylindrical lens being equal to the focal length of the mirrors and the focus of said cylindrical lens laying in the focal plane 33.

In order to increase the beam quality, use can be made of one stop array or a plurality of stop arrays in the multipass cell. Advantageously, use is made of a stop array in the focus plane 33, or in the vicinity of the focus plane 33. The stop arrays have apertures whose geometry is adapted to the beam cross-sections of the respective beam passage locations.

Figure 26:
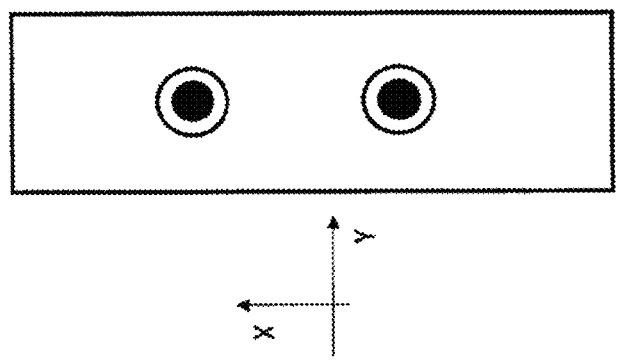
FIG. 26 shows a stop array which can be used in the multipass cell illustrated in FIGS. 10-13, for example, upstream of the mirrors 777 and 778.
Figure 25:
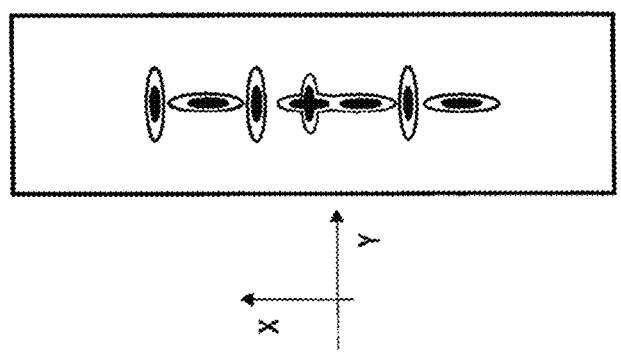
FIG. 25 shows a stop array which can be used in the multipass cell illustrated in FIGS. 10-13, for example, in the focal plane 33.
Figure 24:
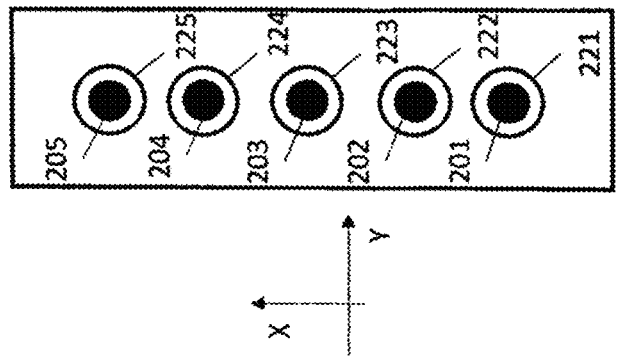
FIG. 24 shows a stop array which can be used in the multipass cell illustrated in FIGS. 10-13, for example, upstream of the mirror 776.

Examples of stop arrays for the White multipass cell illustrated in FIGS. 10 to 13 are shown in FIGS. 24 to 26.

One example of a stop array lying in a plane directly upstream of the mirror 776 is shown in FIG. 24. This focal plane has passages 201, 202, 203, 204, 205. The stop array likewise has five apertures 221, 222, 223, 224, 225. It holds true as a rule of thumb that the aperture cross-sections ought to amount to from 1.3 to 2 times the beam cross-sections of the corresponding Gaussian beam. FIGS. 25 and 26 show by way of example the arrangements of the apertures of stop arrays for the focal plane 33 and respectively at the mirrors 777 and 778.

The present invention is not limited to embodiments described herein; reference should be had to the appended claims.

What is claimed is:

1. An optical arrangement for enlarging spectral bandwidths by nonlinear self-phase modulation for shortening ultrashort pulses, wherein a multipass cell and a nonlinear medium are used, wherein the nonlinear medium is arranged within the multipass cell, and a laser beam having ultrashort pulses passes through the nonlinear medium multiple times, wherein the laser beam is coupled into the multipass cell by way of a shaping optical unit, wherein the laser beam is shaped into an astigmatic beam and coupled into the multipass cell by way of the shaping optical unit.

2. The optical arrangement as recited in claim 1, wherein the multipass cell is a Herriot multipass cell.

3. The optical arrangement as recited in claim 1, wherein the multipass cell comprises three cylindrical mirrors, wherein the three cylindrical mirrors are designed and arranged such that their curvatures lie in a common xz-plane and their focal planes are situated in a common focal plane, wherein the shaping optical unit is designed and arranged such that the laser beam is transformed into a beam which is collimated in the yz-plane and, in the xz-plane, has a focus in the focal plane, and that the nonlinear medium is positioned in the focal plane or in the vicinity of the focal plane, wherein the x-, y-, z-coordinates form a rectangular xyz-coordinate system.

4. The optical arrangement as recited in claim 3, wherein at least one of the mirrors is provided with a coating for dispersion compensation, such that it acts like a GDD or GTI mirror for compressing the pulses.

5. The optical arrangement as recited in claim 1, wherein the multipass cell consists of three spherical mirrors, wherein the three spherical mirrors are designed and arranged such that they form a White multipass cell and have a common focal plane, wherein the shaping optical unit is designed and arranged such that the laser beam is transformed into an astigmatic beam which is collimated in the yz-plane and has a focus in the xz-plane, or is collimated in the xz-plane and has a focus in the yz-plane, wherein the nonlinear medium is positioned in the focal plane or in the vicinity of the focal plane, wherein the x-, y-, z-coordinates form a rectangular xyz-coordinate system.

6. The optical arrangement as recited in claim 1, wherein the multipass cell consists of two cylindrical mirrors, wherein the two cylindrical mirrors are designed and arranged such that their focus lines lie in the xz-folding plane and in a common focal plane, wherein the shaping optical unit is designed and arranged such that the laser beam is transformed into an astigmatic beam which is collimated in the xz-plane and has a focus in the yz-plane, wherein the nonlinear medium is positioned in the focus plane or in the vicinity of the focus plane, wherein the x-, y-, z-coordinates form a rectangular xyz-coordinate system.

7. The optical arrangement as recited in claim 1, wherein the multipass cell consists of two mirror arrays, wherein each mirror array consists of at least two spherical and concave mirror elements, wherein the spherical mirror elements are identically and concavely curved and their focuses lie in a common plane, wherein the shaping optical unit is designed and arranged such that the laser beam is transformed into an astigmatic beam which is collimated in the yz-plane and, in the xz-plane, has a focus in the plane, or is collimated in the xz-plane and, in the yz-plane, has a focus in the plane, wherein the nonlinear medium is positioned in the plane or in the vicinity of the plane, wherein the x-, y-, z-coordinates form a rectangular xyz-coordinate system.

8. The optical arrangement as recited in claim 1, wherein, in order to increase the beam quality use is made of at least one stop array in the multipass cell, wherein the apertures of the stop array are adapted in terms of their geometry to the beam cross-sections of the respective beam passage locations through the stop array, wherein the stop array is arranged at one or more folding mirror/s and/or in the focal plane and/or in the vicinity of the focal plane.

9. The optical arrangement as recited in claim 8, wherein cross-sections of the aperture of the at least one stop array amount to from 1.3 to 2 times the beam cross-section of the corresponding Gaussian beam.

10. The optical arrangement as recited in claim 1, wherein for pulse compression or pulse shortening of the pulses, gratings, prisms, GDD mirrors and/or GTI mirrors are arranged downstream of the multipass cell on the output side, as viewed in the beam propagation direction.

11. The optical arrangement as recited in claim 1, wherein provision is made of at least one further multipass cell for broadening the spectrum.

12. The optical arrangement as recited in claim 1, wherein at least one further arrangement composed of gratings, prisms, GDD mirrors and/or GTI mirrors is used for pulse shortening.

* * * * *